UNITED STATES PATENT OFFICE.

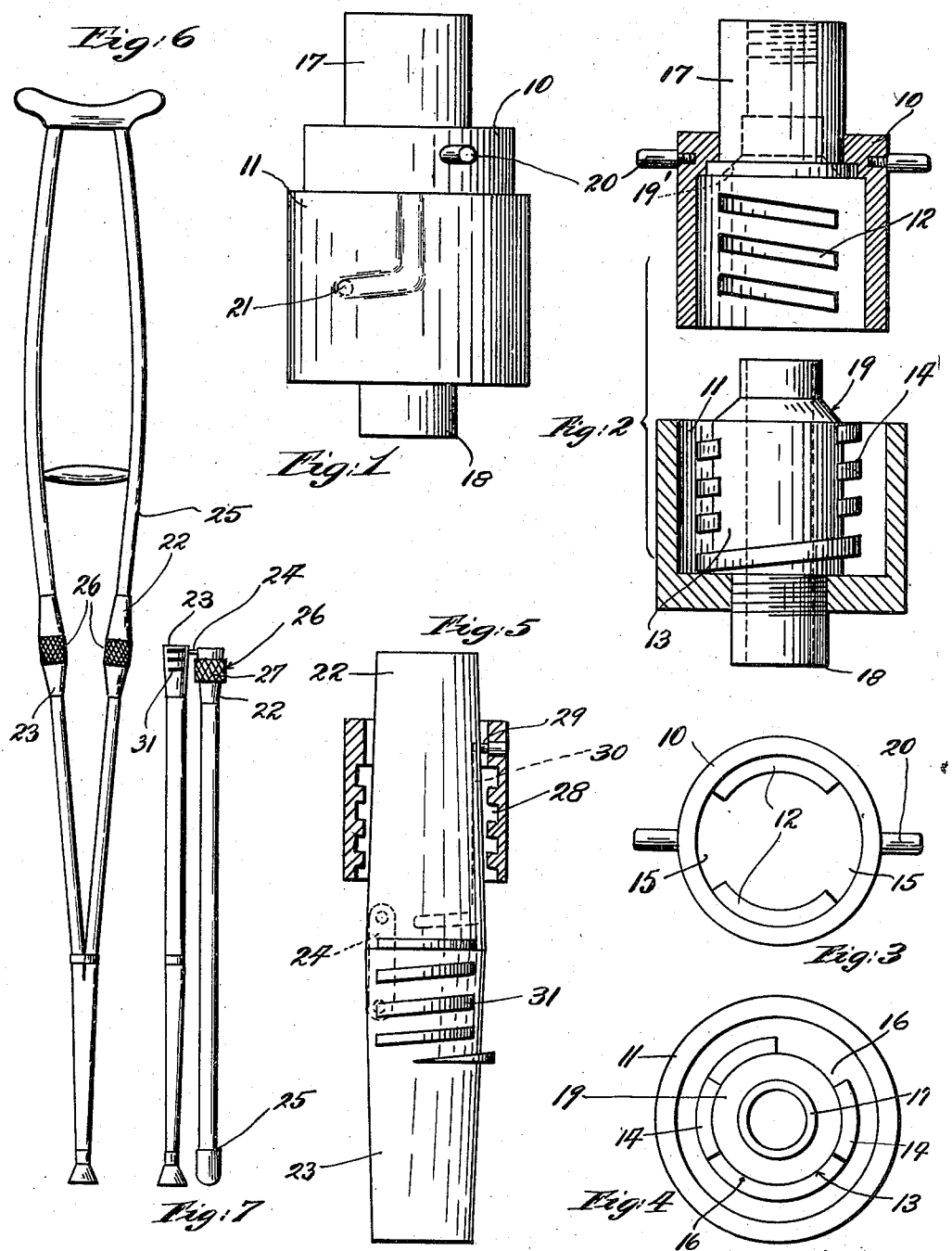

WERNER ZEINDLER AND JOHN E. MARTIN, OF PHILADELPHIA, PENNSYLVANIA.

COUPLING TO BE USED FOR PIPE, HOSE, FOLDING CRUTCHES, AND THE LIKE.

1,311,145.            Specification of Letters Patent.      Patented July 22, 1919.

Application filed January 11, 1919. Serial No. 270,702.

*To all whom it may concern:*

Be it known that we, WERNER ZEINDLER, a citizen of Switzerland, and JOHN E. MARTIN, a citizen of the United States, both residing in Philadelphia, in the county of Philadelphia and State of Pennsylvania, have jointly invented a new and useful Improvement in Couplings to be Used for Pipe, Hose, Folding Crutches, and the like, of which the following is a specification.

The principal object of the present invention is to provide a simple, efficient, and comparatively inexpensive coupling for various purposes such for instance as used for connecting together sections of pipe, hose and the like. A further object is to provide a coupling, the parts of which may be expeditiously connected together or separated. Other and further objects relate to the provision of general details of construction as will hereinafter more fully appear.

The invention consists of the improvements hereinafter described and finally claimed.

The nature, characteristic features and scope of the invention will be more fully understood from the following description taken in connection with the accompanying drawings forming part hereof, and in which:

Figure 1, is a view in elevation of a coupling as used in connection with pipe, hose and the like.

Fig. 2, is a view in section of the coupling parts in position for assembling.

Figs. 3 and 4, are plan views of said coupling parts.

Fig. 5, is a view partly in elevation and partly in section of a form of coupling as used in connection with folding articles, and Figs. 6 and 7 are views illustrative of the application of the latter coupling to a folding crutch.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the drawings and referring more particularly to Figs. 1 and 2, 10 and 11 designate coupling parts of tubular formation and adapted to have telescopic fit with one another. Of these parts, that designated 10 is internally provided with a female thread 12 which is of mutilated type and that designated 11 is provided internally with a central, tubular extension 13 concentrically arranged with respect to the part 11 and is externally provided with a male thread 14 which is also mutilated. In mutilating the threads about one-half thereof is cut away so that about one-quarter of the original thread remains upon opposite sides of the coupling parts the spaces between the portions of the threads remaining being designated 15 in Fig. 3 and 16 in Fig. 4. The innermost portion of the male thread however remains intact for about three-fourths of the circumference of the extension 13 for a purpose to presently appear. Having connection with the parts 10 and 11 are members 17 and 18 for attachment to pipe or hose sections, not shown in the drawings. To assemble the coupling, the parts 10 and 11 are positioned as shown in Fig. 2, that is the unmutilated portions of the male threads are disposed in alinement with the spaces between the female threads and the parts caused to telescope one another. A twist of the wrist moves the member having the female threads a quarter turn which is sufficient to cause an interlocking of the coupling parts. The unmutilated portion of the male thread assists in guiding the screw-threads into coöperative relation. The marginal edge 18 of the extension 13 abuts against the part 19 of the member 17 in the co-acting relation of the assembled parts to form a tight fit to prevent leakage. The part 10 may be provided with pins or extensions 20, whereby said part may be readily moved around its axis. In order that the parts 10 and 11 may be properly positioned with respect to one another for assembling and also to provide extra interlocking of parts a bayonet joint connection 21 may be employed. In Fig. 5 there is illustrated a physical embodiment of the invention wherein the coupling may be applied to folding articles. 22 and 23 designate non-rotatable parts having hinged relation as at 24 by means of a pivotal link connection. The parts 22 and 23 are fixed to the respective portions of a folding article, for instance a crutch 25, see Figs. 6 and 7. The part 22 has loosely fitted thereover a sleeve 26 exteriorly knurled as at 27 and internally provided with a mutilated female thread 28. The sleeve has projected thereinto a pin 29 which engages a slot 30 in the part 22 to form a bayonet joint connection. The part 23 is exteriorly provided with a mutilated male screw-thread 31. To couple the hinged members together the part 22 is swung to abutting, concentric relation with part 23. The sleeve is then moved over such abutting members, the pin 29 meanwhile moving through slot 30, whereupon a twist of the wrist causes the mutilated screw-threads to co-act for interlocking the parts together.

It will be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What we claim is:

1. A device of the character stated comprising coupling parts adapted for interlocking, telescopic engagement of which one part is provided with a mutilated female screw-thread and the other part is provided with a mutilated male screw-thread, and a bayonet joint connection forming a guide to properly aline said mutilated threads and to assist in said interlocking of parts.

2. A device of the character stated comprising coupling parts having hinged relation with one another one of said parts having a mutilated male screw-thread, a sleeve for the other of said parts provided with a female screw-thread also mutilated said sleeve being adapted to co-act with the part having the male threads thereon when said parts are concentrically disposed, and a bayonet connection for guiding said sleeve into co-acting relation with respect to the part having the male threads thereon and to assist in interlocking said parts.

In testimony whereof, we have hereunto signed our names.

WERNER ZEINDLER.
JOHN E. MARTIN.

Copies of this patent may be obtained for five cents each, by addressing the "Commissioner of Patents, Washington, D. C."